United States Patent
DiGiorgio et al.

(10) Patent No.: US 6,418,420 B1
(45) Date of Patent: Jul. 9, 2002

(54) DISTRIBUTED BUDGETING AND ACCOUNTING SYSTEM WITH SECURE TOKEN DEVICE ACCESS

(75) Inventors: Rinaldo DiGiorgio, Stony Brook, NY (US); Michael S. Bender, Boulder Creek, CA (US); Anders Holm, Ballerup (DK); Diana Neiman, Los Altos, CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 09/109,120

(22) Filed: Jun. 30, 1998

(51) Int. Cl.[7] ................................................. G06F 17/60
(52) U.S. Cl. ........................... 705/40; 705/39; 705/43; 705/44
(58) Field of Search ............................. 705/40, 43, 44, 705/39, 35, 65, 67, 68, 54, 26, 80, 41, 21, 24; 235/379, 492, 375

(56) References Cited

U.S. PATENT DOCUMENTS

| | | | |
|---|---|---|---|
| 5,749,078 A | | 5/1998 | Gargiulo et al. |
| 5,765,140 A | | 6/1998 | Lawrence et al. |
| 5,857,079 A | * | 1/1999 | Claus et al. .................. 704/33 |
| 5,915,019 A | * | 6/1999 | Ginter et al. .................. 380/4 |
| 5,917,912 A | * | 6/1999 | Ginter et al. ................. 380/24 |
| 5,949,876 A | * | 9/1999 | Ginter et al. .................. 380/4 |
| 5,982,891 A | * | 11/1999 | Ginter et al. .................. 380/4 |
| 6,122,625 A | * | 9/2000 | Rosen .......................... 705/65 |

FOREIGN PATENT DOCUMENTS

| | | |
|---|---|---|
| EP | 802474 | 10/1997 |
| EP | 833 285 | 4/1998 |
| WO | WO 97/04376 | 2/1997 |
| WO | WO 97/31320 | 8/1997 |
| WO | WO 97/45814 | 12/1997 |
| WO | WO 98/08175 | 2/1998 |
| WO | 98/12675 | * 3/1998 ............. G07F/7/10 |

OTHER PUBLICATIONS

"Smart cards": Promise savings, improved services, Government Accounts Journal, v46, n1,pp. 8–9, Spring '97.*
Anthes, G.H., "SecurID keeps passwords a'changing," *Computerworld*, pp. 51,52 (Mar. 1994).
Burke., "At Sun, it's really all in the cards," *Computer Reseller News*, downloaded May 18, 1999, http://www.crn.com/print–archive/19980420/785inter106.asp (Apr. 1998).
"Coming: A real cash card," downloaded on Feb. 23, 1998, http://www.pathfinder.com@@caok53nzoqeaqho3/asiaweek/95/1103/feat8.html. (Nov. 1995).

(List continued on next page.)

*Primary Examiner*—Robert W. Downs
*Assistant Examiner*—Pedro Kanof
(74) *Attorney, Agent, or Firm*—Lahive & Cockfield, LLP

(57) ABSTRACT

A distributed budgeting and accounting system is designed to operate with secure token devices. The secure token devices serve both as electronic currency purses and as secure vehicles for authorization. The distributed budgeting and accounting system allows a budget to be defined for an organization. The budget is implemented via the secure token devices by transferring electronic currency tokens representing portions of the budgets to secure token devices associated with different portions of the organization. The funds may be transferred down a hierarchical organization by transferring funds between respective pairs of secure token devices. Once the budget has been fully distributed, members of the organization may spend electronic currency tokens on their secure token devices to cover the cost of using resources. Each card holder of the secure token device may only spend up to the amount provided on the associated secure token device. Secure token devices may be provided for service providers so that these funds that are spent to cover the use of resources may be accumulated to it. Accumulated funds may be returned to a central bank. The distributed budgeting and accounting system is used to define an internal economy for the organization.

61 Claims, 14 Drawing Sheets

OTHER PUBLICATIONS

Coopers & Lybrand "The mondex project," downloaded on Feb. 23, 1998, http://www.uk.coopers.com/management-consulting/recruitment/mondex.html.

"Information access and electronic commerce," downloaded on Feb. 23, 1998, http://www.mari.co.uk/copinet/ecpaytok.htm.

"ISO7816 (part 1–3) asynchronous smartcard information," downloaded on Feb. 27, 1998, http://www.cryptsoft.com/scard/iso7816–3.txt.

Mondex, "Mondex wallet: Like having an ATM in your pocket," downloaded on Feb. 23, 1998, http://www.mondexusa.com/html/consumer/walletjs.htm.

Mondex, "Mondexd leads with multos: the first open, high security multi–application operating system for smart cards," downloaded on Feb. 23, 1998, http://www.mondex-usa.com/html/technology/mdxtech.htm.

Mondex, "The Mondex card," downloaded on Feb. 23, 1998, http://www.mondexusa.com/mondex/cgi–b . . . nglish+global&technology_card.html.

Mondex, "Mondex devices," downloaded on Feb. 23, 1998, http://www.mondexusa.com/mondex/cgi–b . . . ish+global&technology_devices.html.

Mondex, "Mondex on–line," downloaded on Feb. 23, 1998, http://www.mondexusa.com/mondex/cgi–b . . . sh+global&technology_internet.html.

Mondex, "The Mondex balance reader," downloaded on Feb. 23, 1998, http://www.mondexusa.com/mondex/cgi–b . . . nglish+global&technology_balance.html.

Mondex, "Frequently asked question: Can you tell me more about Mondex security?," downloaded on Feb. 23, 1998, http://www.mondexusa.com/mondex/ cgi–b . . . h/documents/global/faq27087511.txt.

Mondex, "Frequently asked question: How does Mondex work?," downloaded on Feb. 23, 1998, http://www.mondex-usa.com/mondex/ cgi–b . . . h/documents/global/faq50730160.txt.

Mondex, "Mondex news: Mondex is launched in New York," downloaded on Feb. 23, 1998, http://www.mondex-usa.com/html/main/mondex.htm.

Mondex, "Frequently asked question: How will the scheme be structured?," downloaded on Feb. 23, 1998, http://www.mondexusa.com/mondex/ cgi–b . . . h/documents/global/faq64031289.txt.

"Smart cards: A primer," downloaded Jun. 28, 1999, http://www.javaworld/jw–12–1997/jw–12–javadev.html (Dec. 1997).

Sun Microsystems,"Java card 2.0 programming concepts," Manual, (Oct. 1997).

W3C, "Proposal for an open profiling standard," downloaded Feb. 27, 1998, http://www.w3.org/tr/note–ops–framework.html (Jun. 1997).

* cited by examiner

DISTRIBUTED BUDGETING AND ACCOUNTING SYSTEM WITH SECURE TOKEN DEVICE ACCESS

TECHNICAL FIELD OF THE INVENTION

The present invention relates generally to data processing systems and more particularly to a distributed budgeting and accounting system with secure token device access.

BACKGROUND OF THE INVENTION

Most corporations and other business entities employ some type of computerized budgeting system and some type of computerized accounting system. The computerized budgeting system allows managers to define budgets for respective departments and produces reports that detail the established budgets. The computerized accounting system identifies external accounts receivable and accounts payable. The accounting system may also identify various expenses that are attributed to respective departments.

Such conventional computerized budgeting systems and computerized accounting systems have a number of drawbacks. First, many such systems are not especially well adapted for tracking internal resource usage. The systems are much better adapted for tracking external resource usage. Second, these conventional systems are typically expensive to administer. For instance, they often require the expense of data entry workers for entering information into computer systems. Third, these conventional systems generate a great deal of unnecessary paperwork. For example, an employee may be required to complete a requisition form and have the requisition form approved by a superior (such as by the superior signing the requisition) before a resource is granted to the employee. The employee is subsequently sent an invoice for the charges assessed for using the resource. As a result, large amounts of paperwork are generated for fairly simple transactions.

Many conventional systems do not produce accurate pictures of resource consumption. These conventional systems have no mechanism for monitoring actual usage of resources, such as network bandwidth. The budgeting systems are also inaccurate in that the cost of the resources is often shared equally among multiple parties based upon an estimation of use rather than actual use of the resource.

Thus, there is the need for an improved computerized budgeting system and computerized accounting system.

SUMMARY OF THE INVENTION

The present invention addresses the limitations of the prior art by providing a distributed budgeting and accounting system that utilizes secure token devices, such as smart cards or ibuttons. A secure token device is a device that holds currency tokens and other information in a secure fashion. Preferably, the secure token device is of a size, shape and weight that it is easily carried by a user. The secure token devices are used both for authentication and for participation in electronic commerce. Specifically, the secure token devices hold electronic currency tokens that may be utilized to pay for the use of resources within an internal economy of an organization, such as a corporation. The secure token devices also securely hold identification information that is used to confirm that a party is who the party purports to be. To that end, the secure token device serves as a vehicle for decreasing fraudulent use of resources. The owner of a secure token device may be required to enter a personal identification number (PIN) prior to gaining access to a resource to ensure that the proper party is using the secure token device.

The distributed budgeting and accounting system of the present invention allows holders of secure token devices to gain access to internal resources of an organization. These internal resources may be, for example, computing resources but may also be non-computing resources that need to be monitored. In order to use a resource, a holder (i.e. a "resource consumer") must place a secure token device that is owned by the holder into communication with a reader. Based upon identification information contained within the secure token device, the system may determine whether the holder is permitted to access the resource or not. The secure token device is then debited to cover the cost of using the resource. This debiting may entail transmitting electronic currency tokens from the secure token device of the holder to a service provider secure token device or virtual service provider account.

In one embodiment of the present invention, a hierarchy of secure token devices may be defined for the internal economy of the organization. The hierarchy parallels the logical hierarchy of the organization. Electronic currency tokens flow from a currency secure token device at the top of the hierarchy to secure token devices for upper levels of the organizations based upon a defined internal budget. In a corporation, these upper levels may constitute business units. The electronic currency may further flow down to secure token devices for lower levels of the organization. In a corporation, the electronic currency may flow from the secure token devices of business units to sub-units and from the secure token devices of sub-units to the secure token devices of employees based upon the budget. The hierarchical organization of the budget flow is configurable and may be defined by the organization.

Electronic currency may also flow upward in the hierarchy to return unused electronic currency to higher levels of the hierarchy. Moreover, electronic currency that has been accumulated due to the use of resources that are provided by a service provider may be forwarded up the hierarchy to be returned ultimately to a central bank secure token device.

The present invention has the benefit of requiring little paperwork. No requisitions or invoices are needed in this system. A holder of a secure token device is distributed electronic currency tokens and preauthorized to spend those tokens based upon defined rights of the holder. It is up to the holder to determine how to spend those electronic currency tokens on internal resources. The holder consumes the resources and pays for use of the resources. There is also no need to generate invoices as a holder of a secure token device is charged for the use of resources at the time that the holder requests to use the resources.

The present invention also enhances the accuracy of the budgeting and accounting processes. An employee or business unit may not exceed their budget without knowledge of the appropriate parties. The amount of electronic currency that is transferred to an employee or business unit manager defines the extent of the budget. In order to exceed the budget, the employee or business manager must obtain added electronic currency from the appropriate empowered parties.

The present invention has the further benefit of accurately accounting for the use of resources. A record of each use of a resource is automatically provided by the distributed budgeting and accounting system. A determination is made a priori as to what resources are to have an associated expense for which resource usage is to be tracked.

BRIEF DESCRIPTION OF THE DRAWINGS

An illustrative embodiment consistent with the principles of the present invention will be described below relative to the following drawings.

DETAILED DESCRIPTION OF THE INVENTION

Figure 1:
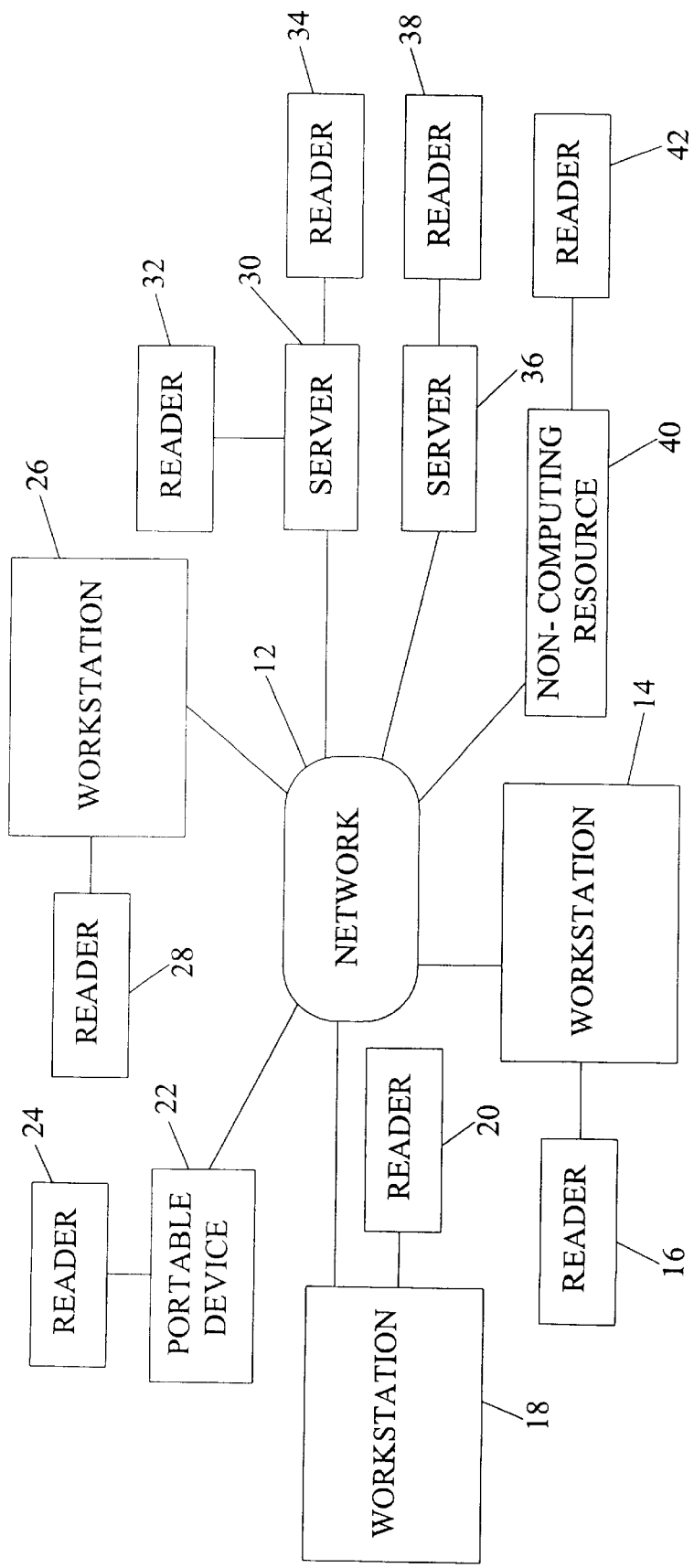
FIG. 1 is a block diagram of a distributed computing system that is suitable for practicing the illustrative embodiment consistent with the principles of the present invention.

The illustrative embodiment consistent with the principles of the present invention provides a distributed budgeting and accounting system for an organization, such as a corporation or other entity. The distributed budgeting and accounting system facilitates the definition of a budget and accurately tracks the use of internal resources. The distributed budgeting and accounting system eliminates the need to utilize requisition forms and invoices for the use of internal resources. The system accurately tracks the use of such internal resources and enforces the budget defined for consumption of those resources.

The distributed budgeting and accounting system of the illustrative embodiment is adapted for use with secure token devices, such as smart cards and ibuttons. The secure token devices are used both for authentication and electronic commerce. In a corporation, each employee and manager is given a secure token device that holds identification information about the holder and electronic currency tokens. The identification information may be utilized to authenticate the holder of the secure token device as the party the holder purports to be. The secure token device is physically secured to make it extremely difficult to obtain the identification information and electronic currency contained therein. Moreover, it is difficult to fraudulently produce a counterfeit secure token device. The electronic currency tokens stored on the secure token devices are used to pay for the consumption of resources within a defined internal economy for the organization. Resources are paid for at the time that the resources are consumed. Hence, the distributed budgeting and accounting system provides an up to date and accurate accounting of the consumption of resources.

In the illustrative embodiment consistent with the principles of the present invention, a budget is defined to identify how much electronic currency will be distributed to respective levels of a hierarchical organization. These levels of the organization may be, for example, business units, departments, projects, employees and the like. The budget defines how much of the electronic currency is distributed to these respective levels of the organization. Secure token devices act as the budget distribution vehicles. Each level of the business organization has an associated secure token device. Respective holders of secure token devices are then charged with the responsibility for spending the electronic currency on internal resources as needed. In other words, these holders of secure token devices are preauthorized to spend the electronic currency on internal resources.

Roles are defined for each holder of a secure token device within the internal economy. These roles define the rights that are granted to the holder. When a secure token device holder seeks to access certain resources, the current role of the holder is examined to determine if such access is permitted. The checking of the role of a holder helps to ensure that only authorized parties are permitted to access resources and perform operations.

In the illustrative embodiment consistent with the principles of the present invention, the budgeting and accounting system is implemented as a distributed software facility. The facility may roughly be divided into client components and a server component. The server component is resident on a server computer system and performs the majority of the work required of the package. The client components are resident on client computer systems, such as workstations or personal computers. Each client portion interacts with the server portion to implement the distributed budgeting and accounting system. One of the primary roles of the facility is to support the use of secure token devices in a distributed environment.

As mentioned above, the secure token device serves multiple roles within the internal economy of the illustrative embodiment. First, the secure token device serves as a secure purse mechanism for distributed budgeting and accounting within the closed economy. The secure token device, however, also serves as a base authentication authorization mechanism. It is via the secure token device, that the holder of the secure token device gains access to a computer network of an organization. Secure token devices also facilitate low transaction cost within the computer network and provide a mechanism that is both portable and secure.

In order to clarify the discussion below, it is helpful to define a few terms.

A "smart card" is an integrated circuit card that acts as a secure electronic device. The phrase "smart card" is intended to encompass devices that comply with the ISO- 7816 standard established by the International Organization of Standards and devices that comply with the EMV (defined by Europay, Mastercard and Visa) integrated circuit card specification.

A "secure electronic device" refers to an electronic device with which secure communications may be realized. For example, a secure electronic device may communicate an encryptic form to protect communications. The device should facilitate both privacy and authentication.

An "organization" is something that has been organized into an ordered whole. An "organization" is intended to include a corporation, a sole proprietorship, a partnership, or other business entity.

"Electronic currency" refers to currency that is electronically encoded into units or tokens. Electronic currency includes currency encoded with known digital cash or electronic commerce schemes.

A "token" is a data structure that constitutes a unit of electronic currency and may be digitally fueled or within a digital envelope. A token may be encrypted.

A "computing resource" refers to any of a number of resources that are part of a distributed system. Computing resources include, computer systems, such as server computer systems, workstations, personal computers and portable computer systems, storage capacity, network bandwidth and other resources that are consumed within a computing environment.

A "service provider" is an entity, such as an application program, that provides a service to a party.

FIG. 1 is a block diagram of a distributed computer system 10 that is suitable for practicing the illustrative embodiment consistent with the principles of the present invention. The distributed computer system 10 includes a network 12, such as a local area network (LAN), for interconnecting computing resources. These resources may include a number of workstations 14, 18 and 26, as workstations produced by Sun Microsystems, Inc. Each workstation includes a reader 16, 20 and 28, respectively that is coupled to it. Those skilled in the art will appreciate that the readers may be directly integrated into the workstations. Each reader is a hardware device for facilitating communications between a secure token device and a computer system. For example, reader 16 facilitates communications between workstation 14 and a secure token device. The readers may be, for example, for use with a smart card or an ibutton. In order to use a smart card, a party places the smart card in a smart card reader. Electrical contact on the smart card interface with corresponding contacts on the card reader to facilitate communications. A number of different commercially available smart card readers may be utilized in the illustrative embodiment consistent with the principles of the present invention. For example, the IBM 5948 card terminal (available from International Business Machines Corporation) may be utilized. The smart card readers may include a keyboard for entering a personal identification number (PIN).

An ibutton is a computer chip that is housed in a cylindrical housing (such as a steel canister). The housing is designed to withstand the harsh conditions of outdoor environments. The ibutton may be incorporated into a ring or other wearable itemfor instance, ibuttons may be affixed to badges, watches, rings, key chains and the like. The chip within the housing includes a microprocessor and may also contain computer memory, a clock or sensors. Such ibuttons are used by contacting the ibuttons with readers (e.g. "blue dot receptors") that are cabled into the serial ports of associated computers. A suitable ibutton for practicing the illustrative embodiment consistent with the present invention is the Java™ Ring produced by Dallas Semiconductor Corporation. Java is a trademark or registered trademark of Sun Microsystems, Inc. in the United States and in other countries. A suitable reader is the DS1402 blue dot receptor from Dallas Semiconductor Corporation. The reader may also be a proximity detector.

Server computer systems 30 and 36 are connected to the network 12. The server computer systems 30 and 36 execute portions of the distributed budgeting accounting system. These server computer systems 30 and 36 may also execute application programs that provide services to which holders of secure token devices seek access. The servers 30 and 36 may have attached readers 32, 34 and 38. As will be described in more detail below, these readers may be used in conjunction with service provider secure token devices. A server (e.g., server 30) may have more than one reader 32 and 34 attached to facilitate concurrent access by multiple holders of secure token devices.

A portable computing device 22 may also be connected to the network 12. This portable device 22 has an attached reader 24. The portable device may, for example, be a laptop computer, a palmtop computer, a personal digital assistant (PDA) or a smart card wallet device. Those skilled in the art will appreciate that the portable device 22 may also be, more generally, any type of computing device to which is appropriate to have a reader 24 attached.

Non-computing resources 40 may also have a reader 42 coupled to them. An interface may be provided to couple the non-computer resource 40 or the reader 42 with the network 12. It may be desirable to provide such an arrangement to budget and monitor use of non-computing resources. In this fashion, a secure token device may serve as a vehicle for gaining access to such noncomputing resources 40, such as, copiers and facsimile machines. Those skilled in the art will appreciate that additional types of resources may also be monitored and budgeted by the present invention.

Those skilled in the art will appreciate that the configuration shown in FIG. 1 is intended to be merely illustrative and not limiting of the present invention. The present invention may be practiced in other computing environments, including nondistributed environments. Moreover, different types of components may be utilized in practicing the present invention. Still further, the present invention may be practiced with a wide area network (WAN), including the Internet rather than a LAN.

Figure 2:
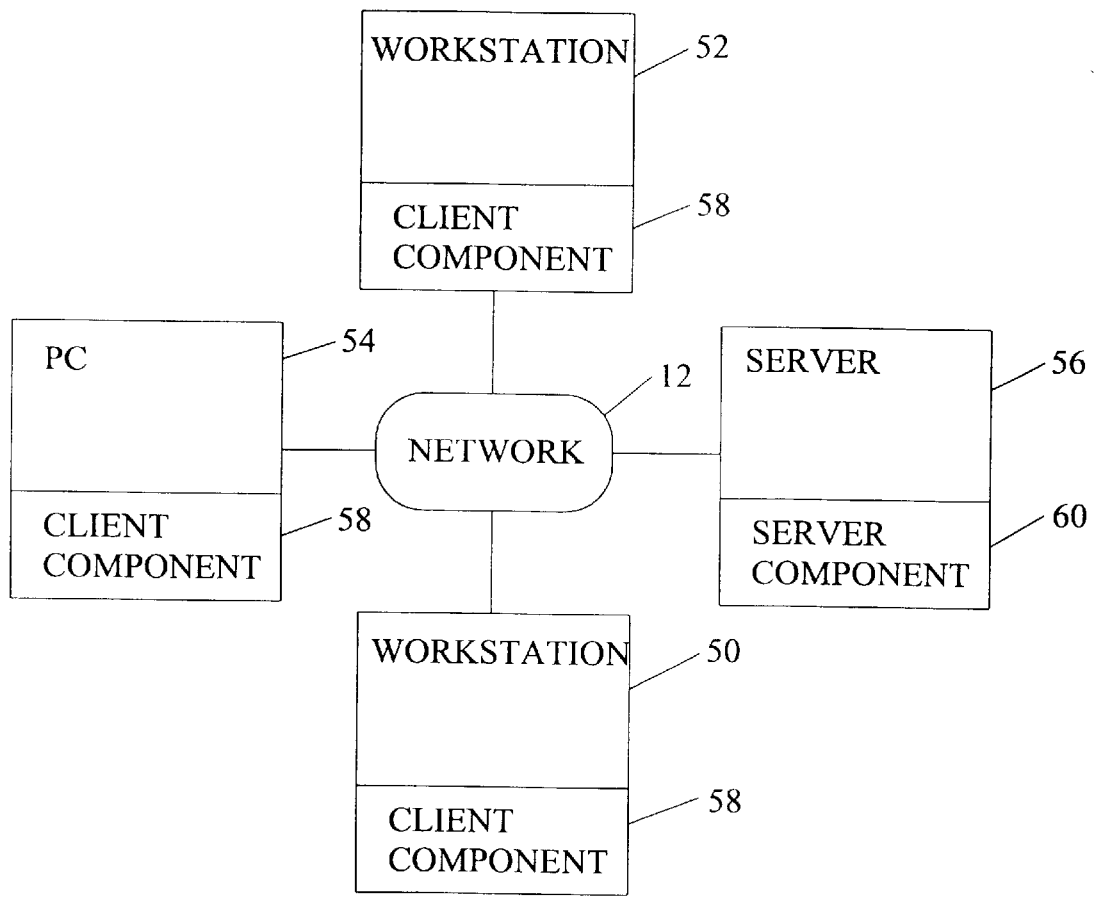
FIG. 2 is a block diagram illustrating respective client and server components of the distributed budgeting and accounting system used in the illustrative embodiment consistent with the principles of the present invention.

The distributed budgeting and accounting system of the illustrative embodiment of the present invention is implemented as a distributed software facility. The software facility includes client components and one or more server components. FIG. 2 shows a simplified example of a computing environment wherein the software facility of the illustrative embodiment of the present invention is installed. Workstations 50 and 52 include client components 58. Similarly, personal computer (PC) 54 includes a client component 58. A server component 60 is resident on a server 56 that is in communication with the workstation 52 and the PC 54 via a LAN. The client component 58 facilitates communications with the server component 60 and performs client-side functionality. In the illustrative embodiment of the present invention, the software system adopts a client/server model where clients request service provided by the server. The client component may also be installed on readers in some instances (such as instances wherein the reader is coupled to noncomputer resource).

Figure 3C:
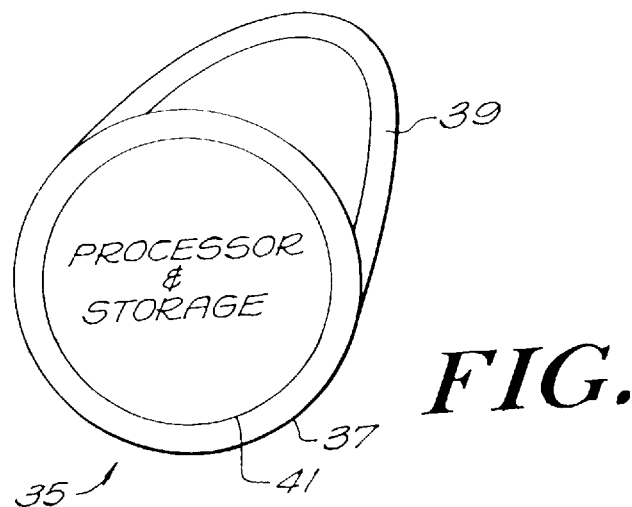
FIG. 3C depicts the physical layout of an ibutton for use in the illustrative embodiment.
Figure 3A:
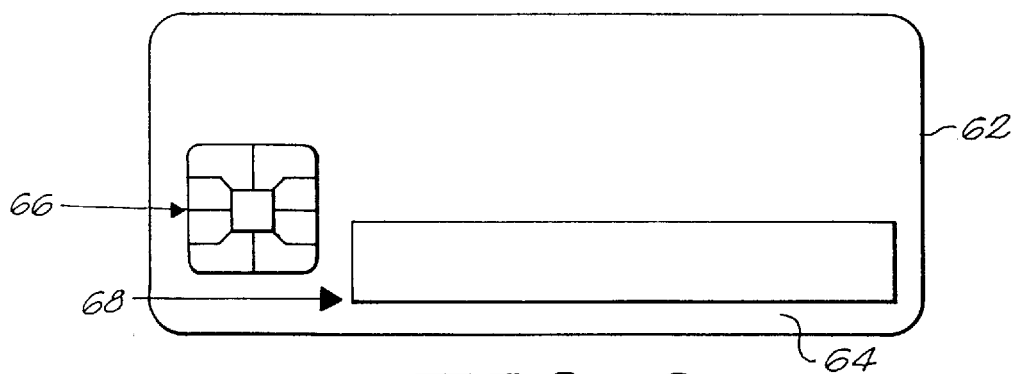
FIGS. 3A and 3B depict the physical layout of a smart card for use in the illustrative embodiment.
Figure 3B:
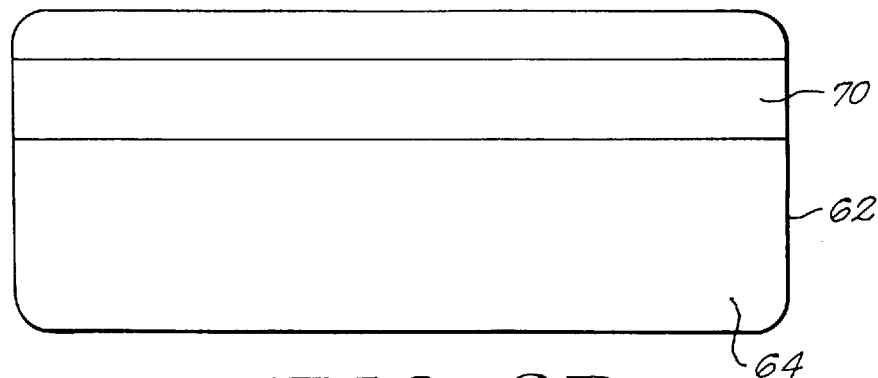

FIGS. 3A and 3B illustrate the physical layout of a smart card that is suitable for use in the illustrative embodiment consistent with the principles of the present invention. FIG. 3A shows the front side of a smart card 62, and FIG. 3B shows the rear side of the smart card 62. The front side of the smart card 62 includes the set of electrical contacts 66. These contacts are used to establish electrical contact with the smart card reader and to provide power to the computer components on the smart card. These contacts facilitate communications between the smart card and smart card readers. The front of the smart card may include an embossing area 68 where a user may sign the smart card to help establish the authenticity of the card. The rear side of the smart card shown in FIG. 3B may include a magnetic strip 70 on which magnetic information is encoded. In some instances, the smart card may be used for dual purposes. For example, the smart card may be used to provide building access control. In such an instance, the smart card magnetic strip 70 holds identification information that may be passed through a magnetic card reader to facilitate access to restricted areas. Those skilled in the art will appreciate that the magnetic strip 70 will also include additional types of information and may be used in additional applications.

Those skilled in the art will appreciate that the physical layout of the smart card shown in FIGS. 3A and 3B is intended to be merely illustrative and not limiting of the present invention. A number of different layouts may be utilized in practicing the present invention. Preferably, the smart cards comply at least in part with the ISO-7816 standard established by the International Organization of Standards or the EMV specification.

FIG. 3C depicts an example of the physical layout of a Java Ring 35 that is suitable for practicing the present invention. The Java Ring 35 includes a steel cylindrical housing 37 that houses an integrated circuit (IC) 41 that contains a microprocessor and a storage (i.e. a computer memory). The Java Ring 35 also includes a ring portion 39 that enable a user to wear the whole device like an ordinary ring. As will be described in more detail below, the processor and storage work in conjunction to runs programs that help facilitate the illustrative embodiment consistent with the principles of the present invention.

Figure 4:
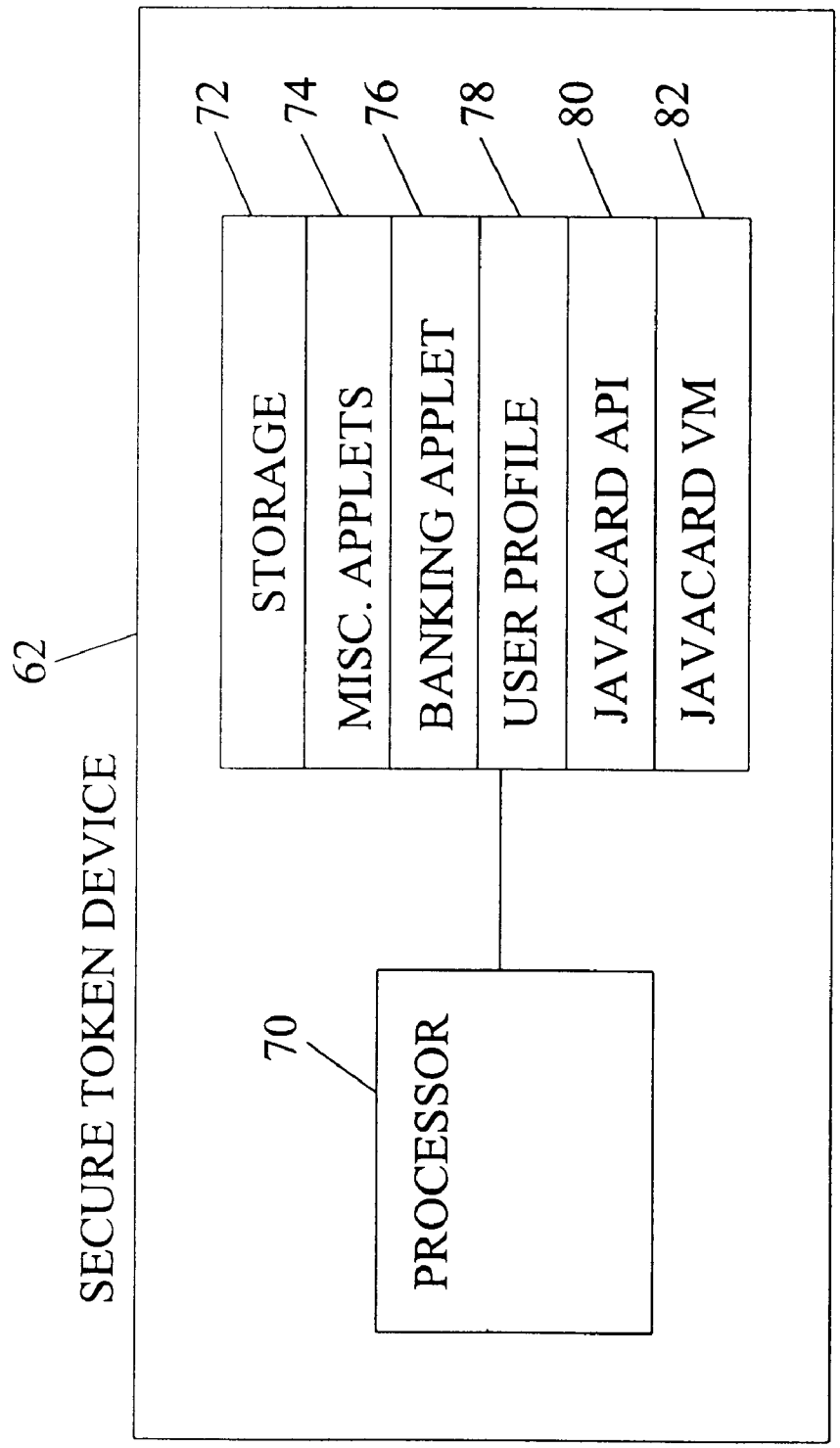
FIG. 4 illustrates the computer components of a secure token device in the illustrative embodiment.

FIG. 4 shows the logical organization of computer components found on the secure token device 62. The secure token device 62 includes a processor 70, such as a microprocessor for executing instructions. The secure token device 62 also includes a storage 72. The storage 72 may be provided by multiple types of devices independently or in conjunction with each other. These devices may include random access memory (RAM) devices, read only memory (ROM) devices, electrically erasable programmable read only memory (EEPROM) devices or other suitable memory devices.

In the illustrative embodiment consistent with the principles of the present invention, the secure token device complies with the Java™Card™ 2.1 specification as established by Sun Microsystems, Inc. This specification includes an application program interface (API) and requires that the secure token device be able to execute programs written in the Java programming language. The API is described in more detail in "JavaCard 2.1 Application Program Interfaces," Sun Microsystems, Inc., which is explicitly incorporated by reference herein. Applets are mini-programs that are facilitated by the Java programming language. Such applets typically execute on an applet viewer or a web browser that includes a virtual machine (VM) for interpreting the Java applets. The storage 72 may include a number of different applets 74 that provide various functionalities when run on the processor 70. A banking applet 76 may be provided to facilitate the participation of the secure token device in electric commerce transactions. In the illustrative embodiment, it is presumed that the banking applet 76 enables the secure token device to participate in MONDEX transactions. MONDEX is an electronic commerce system developed by National Westminister Bank in the United Kingdom. Nevertheless, those skilled in the art will appreciate that the secure token devices may also be used with other electronic commerce or digital cash systems. The references to MONDEX is intended to be merely illustrative. The system provides for multi-currency digital cash on secure token devices. Each secure token device contains sufficient capability to accomplish token transfers independently of any real time central approval system. Transactions are completed over a communication link with defined protocols and through a security model that is implemented in part by the secure token device. Those skilled in the art will appreciate that the banking applet alternatively may be compatible with other types of electronic commerce systems.

As the secure token device is compliant with the JavaCard 2.1 specification, a copy of the JavaCard API 80 is held within the storage 72. Furthermore, the JavaCard virtual machine (VM) 82 is held in the storage 72. The JavaCard VM 82 is a stripped-down version of the conventional Java VM 82 that provides platform independence for Java applets. The JavaCard VM provides the intelligence to interpret Java applets to realize the desired functionality. Those skilled in the art will appreciate that the present invention need to be practiced with the JavaCard API and the JavaCard VM. The present invention may also be practiced with other API's, with different VMs and with code that is written in programming languages that do not require a VM.

The storage 72 also holds a user profile 78 that encodes identification and other information regarding the user (i.e., the card holder). The user profile 78 may comply with the Open Profiling Standard (OPS) or the Information & Content Exchange (ICE) protocol, for instance. Other contextual and configuration information may also be encoded within the user profile or more generally held within the storage 72.

Figure 5:
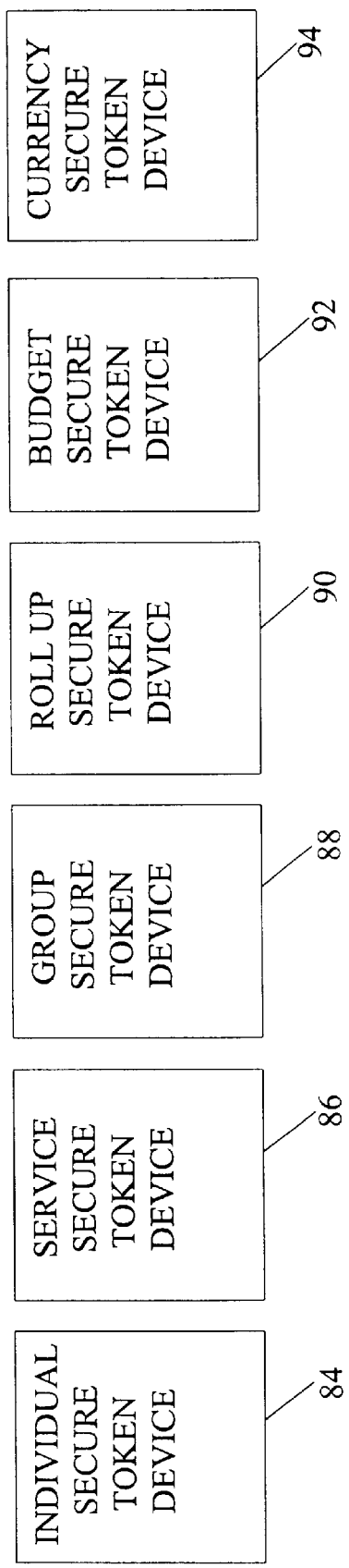
FIG. 5 illustrates different varieties of secure token devices that are utilized in the illustrative embodiment.

The illustrative embodiment assumes that there are a number of different types of secure token devices used such as illustrated in FIG. 5. All exchange of currency occurs between pairs of secure token devices. Thus, a transaction can only be completed when two secure token devices are present. The different types of secure token devices play different roles within the internal economy of the illustrative embodiment. An individual secure token device 84 is the type of device that is given to an employee within the corporation or other business entity in which the internal economy is established. Individual secure token devices 84 hold identification information regarding the holder and store electronic currency tokens for the holder.

The service secure token device 86 is associated with a given service provider. The service secure token device 86 holds information regarding the associated service provider and is used to collect funds (i.e., currency tokens) from parties that request the service that is provided by the service provider. The service secure token device 86 may be positioned within readers affixed to the servers that provide the associated service. The service secure token device may be a virtual device that is implemented in software rather than as a physical device. In general, virtual devices may be used to implement the different varieties of secure token devices.

A group secure token device 88 is associated with a department manager or business unit manager (or more generally, a given level of an organization) to obtain funds from a budget secure token device 92 (which will be described in more detail below) and for distribution of funds in the form of electronic currency to other business subunits or individuals.

A roll up secure token device 90 acts as a local repository or bank for receiving funds that have been accumulated by a service provider. Thus, funds that are gathered by one or more service secure token devices 86 may be accumulated by a rollup secure token device 90.

A budget secure token device 92 plays a role in distribution of funds from a budget and in accumulating funds from service providers, as will be described in more detail below. A budget secure token device 92 is an upper level card in the organization hierarchy that receives funds from a currency secure token device 94 and distributes funds to group secure token devices 88.

The currency secure token device 94 is the central repository or bank from which all finds are initially distributed. In the hierarchy of secure token devices, the currency secure token device is at the top of the hierarchy. The internal economy of an organization includes only a single central bank card 94.

All of the secure token devices are registered in a registry. Functions are provided in the distributed budgeting and accounting system to add or remove secure token devices from the registry. The registry is stored persistently.

Figure 6:
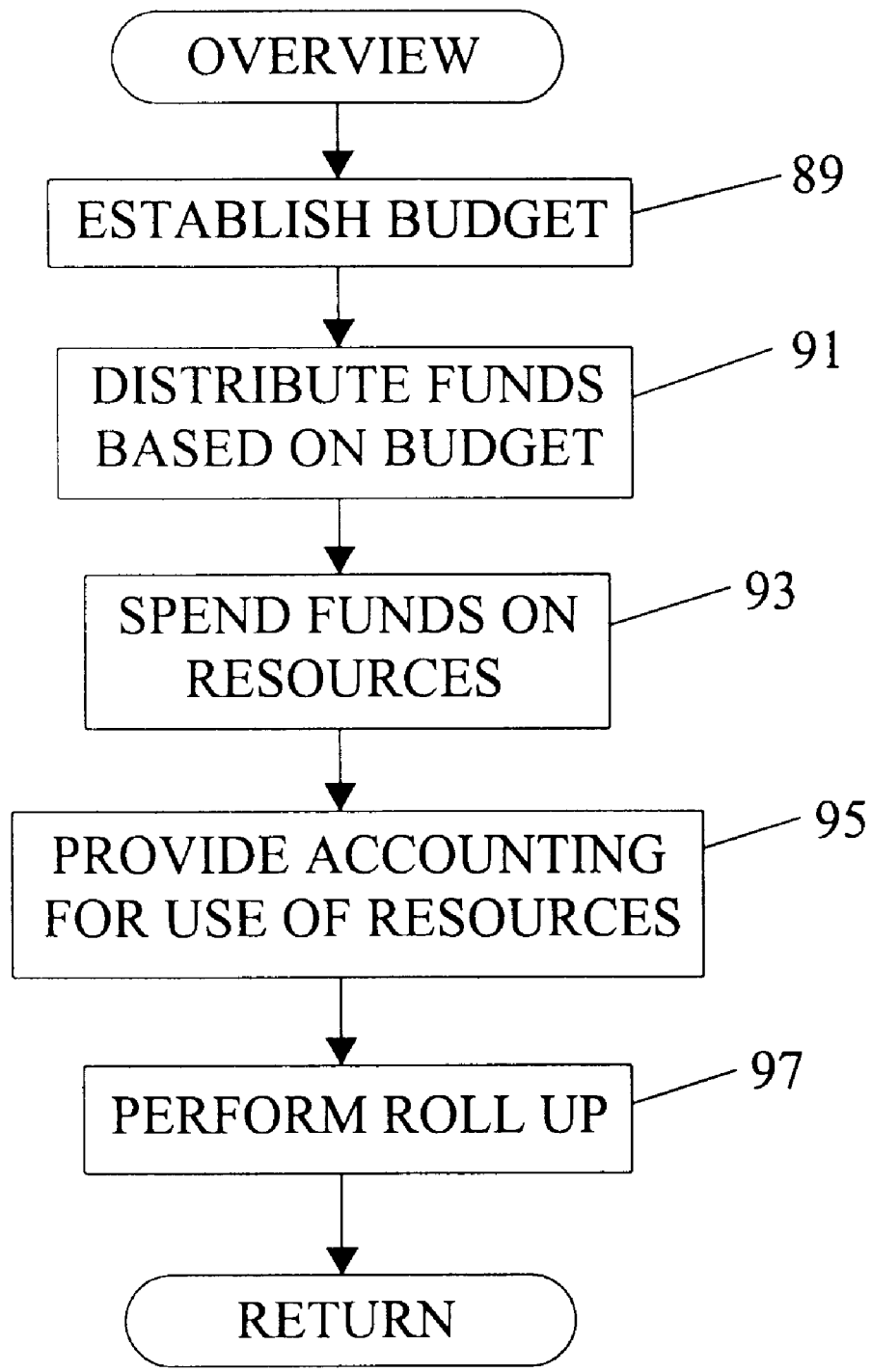
FIG. 6 provides an overview of the steps that are performed to realize the flow of funds in the illustrative embodiment.

FIG. 6 provides an overview of the steps that are performed to use the electronic currency tokens in the internal economy. Initially, a budget is established for an internal economy for a fixed period of time, such as a year (step 89 in FIG. 6). The establishment of the budget entails identifying the respective levels of the organization to which the economy is to be applied. In a corporation, this may entail defining a hierarchy of business units and assigning users (i.e., secure token device holding employees) to particular business units. The budgeting process also entails determining the total amount of electronic currency to be present in the internal economy and deciding what quantities are to be passed to the upper levels of the organization. As will be described in more detail below, the upper levels are charged with the responsibility of distributing portions of their budgets of the lower levels. Defining the budget also entails identifying what resources are to be budgeted and monitored by the distributed budgeting and accounting system.

In the illustrative embodiment, the corporation for which the internal economy is maintained is divisible into business units. A separate business unit object is defined (as will be described in more detail below), for each business unit for holding information regarding the business unit. Employees are associated with business units and information regarding each employee (i.e. "user") is provided on a respective secure token device.

Figure 7:
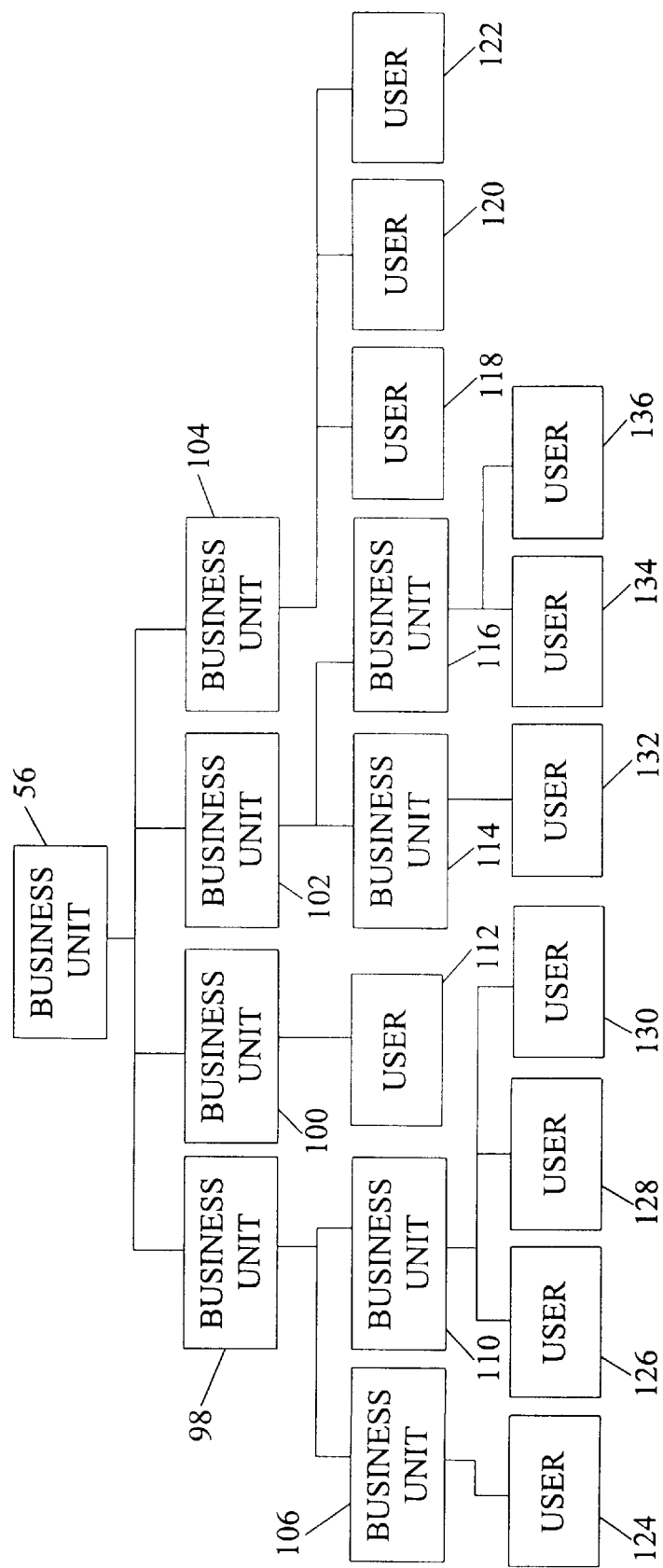
FIG. 7 illustrates an exemplary hierarchy of business units and users for a corporation.

After the budget has been established in step 89 of FIG. 6, the funds to be used within the internal economy are distributed based on the budget (step 91 of FIG. 6). In order to appreciate the distribution of funds, it is helpful to first review the hierarchy of the entity used by the distributed budgeting and accounting system of the illustrative embodiment of the present invention. Steps 93, 95 and 97 of FIG. 6 will be described in more detail below. FIG. 7 shows an example of the hierarchical organization of a corporation. The corporation has a root or top level business unit 96 and four children business units 98, 100, 102 and 104. Funds initially flow from the top level business unit 96 to the children business units 98, 100, 102 and 104. In particular, the electronic currency tokens flow to managers of the children business units 98, 100, 102 and 104. The managers are charged with responsibility of distributing funds for the respective business units 98, 100, 102 and 104. Each business unit may have one or more subunits. For example, as shown in FIG. 7, business unit 98 has sub-units 106 and 110. Similarly, business unit 102 has sub-units 114 and 116. On the other hand, a business unit need not have any sub-units. For example, business unit 100 has no sub-units and has only single user 112 associated with it. On the other hand, business unit 104 has three users 118, 120 and 122 associated with it. The sub-units may have additional subunits or may have associated users. In the example shown in FIG. 7, business unit 106 has associated user 124, and business unit 110 has associated users 126, 128 and 130. Business unit 114 has associated user 132 and business unit 116 has associated users 134 and 136.

The manager of a business unit is responsible for distributing funds to the next lowest level in the hierarchy. Thus, the manager of business unit 98 is responsible for distributing funds to its children, business units 106 and 110. Specifically, the funds are distributed from the manager of business unit 98 to the managers of business units 106 and 110. The manager of business units 106 and 110 are responsible for distributing the funds to the users that are associated with the business units. Thus, business unit 110 distributes funds to users 126, 128 and 130. As will be described in more detail below, these funds are distributed to secure token devices for the users 126, 128 and 130. Business unit 100 does not distribute funds to a child business unit but rather distributes funds to a user 112.

Those skilled in the art will appreciate that the hierarchy shown in FIG. 7 is intended to be merely illustrative and not limiting of the present invention. The present invention need not be practiced in a corporate or business environment, but may be practiced with other environments as well. The present invention is equally applicable to virtual organizations, sole proprietorships, partnerships, non-profit organizations and other types of organizations. The number of levels in the hierarchy of an organization is completely configurable by the designers of the budget. Furthermore, the configuration of the hierarchy is entirely at the discretion of the designers of the budget.

It should be appreciated that transfer of funds in step 91 of FIG. 6 is always from one secure token device to another. For instance, the transfer of funds from business unit 98 to business unit 106 is realized via a transfer of funds between the secure token device for the manager of business unit 98 and the secure token device for the manager of business unit 106.

Figure 8:
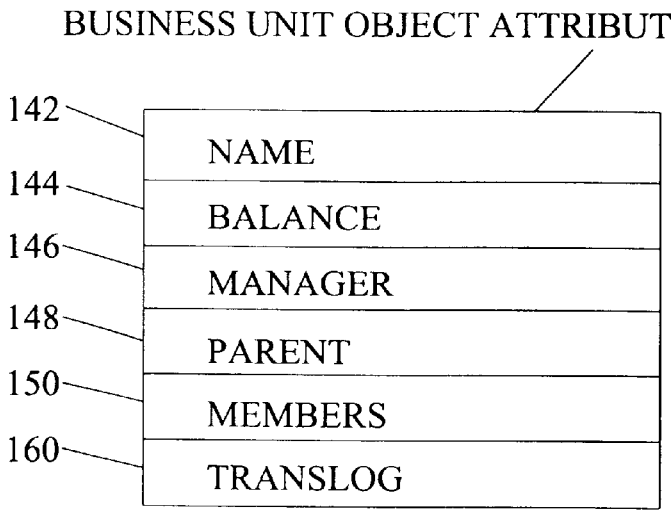
FIG. 8 illustrates attributes of a business unit object.

Each business unit has an associated object. FIG. 8 depicts a number of the attributes 140 that are associated with business unit objects. The name attribute 142 holds the name of the business unit. The balance attribute 144 holds the balance of electronic currency tokens on the secure token device of the manager of the business unit. The manager attribute 146 identifies the manager of the business unit. The parent attribute 148 identifies the parent, if any, of the business unit. The highest level business unit has no parent specified in the parent attribute 148. The members attribute 150 identifies the children of the business unit within the hierarchy. Hence, for business unit 98, the members attribute 150 identifies business units 106 and 110. The translog attribute 160 holds a value that serves as a transaction logging on/off switch. Transactions for the business unit may be logged to record transactions of not logged on how this switch is set.

Figure 9:
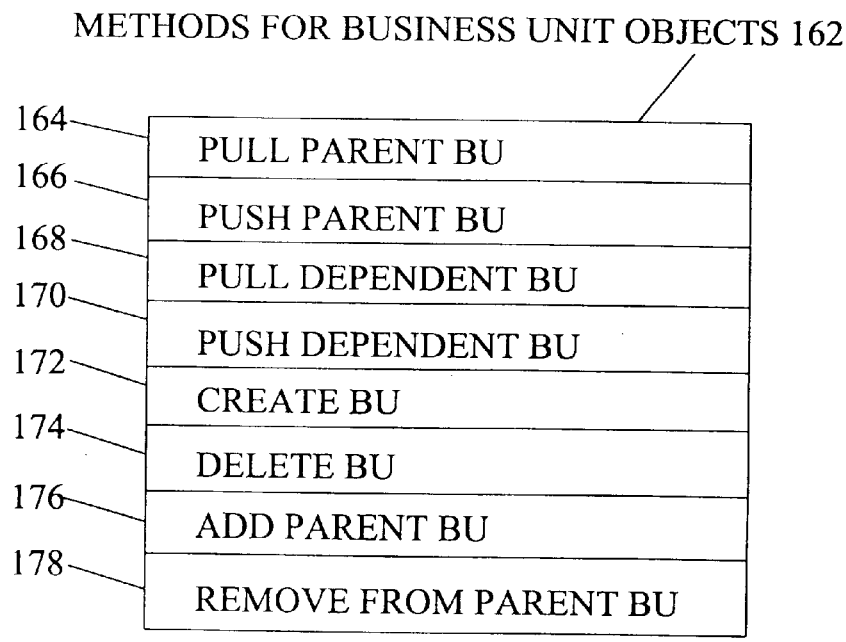
FIG. 9 illustrates methods practiced on a business unit object.

A number of methods are supported by business unit objects. These methods 162 are itemized in FIG. 9. Those skilled in the art will appreciate that this list is not intended to be exhaustive or limiting of the present invention. Funds can generally be transferred a level immediately above or a level immediately below the party that is making the transfer in the hierarchy. Thus, a business unit may transfer funds to or from its parent. Similarly, a business unit may transfer the funds to or from its children. A number of methods facilitate such transfers. The pull parent BU method 164 pulls funds from a parent business unit. The push parent BU method 166 returns funds to a parent business unit. The pull dependent BU method 168 pulls funds from a child. The push dependent BU method 170 distributes the funds to a child.

A number of other methods are provided for creating and destroying business units. The create BU method 172 creates a new business unit within the hierarchy. As organizations may be dynamic, there is a need to be able to create additional business units as warranted. The delete BU method 174 deletes a business unit. The add parent BU method 176 adds a new parent business unit and the remove from parent BU method 178 removes a parent business unit.

Figure 10:
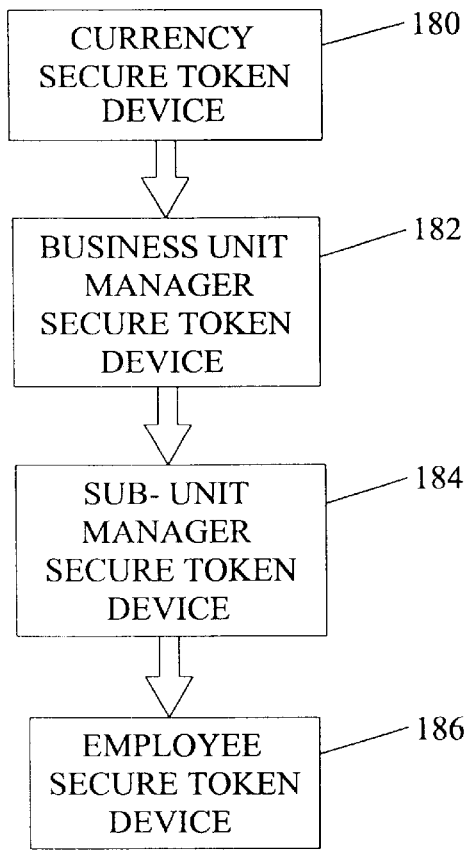
FIG. 10 illustrates an example flow of electronic currency during distribution of a budget.

FIG. 10 illustrates an example of the flow of funds (i.e., electronic currency tokens) in step 91 of FIG. 6. Initially, the funds are distributed from the currency secure token device 180 for the organization to a business unit manager secure token device 182 for an upper level business unit. Funds are then distributed from the business unit manager secure token device 182 to a sub-unit manager secure token device 184. Ultimately, the funds are then further distributed from the sub-unit manager secure token device 184 to the employee card 186. It should be appreciated that the depiction in FIG. 10 is intended to be merely illustrative of one exemplary flow of funds. The distribution of funds to realize the budget is generally performed as a secure token device to secure token device transfer.

Figure 11A:
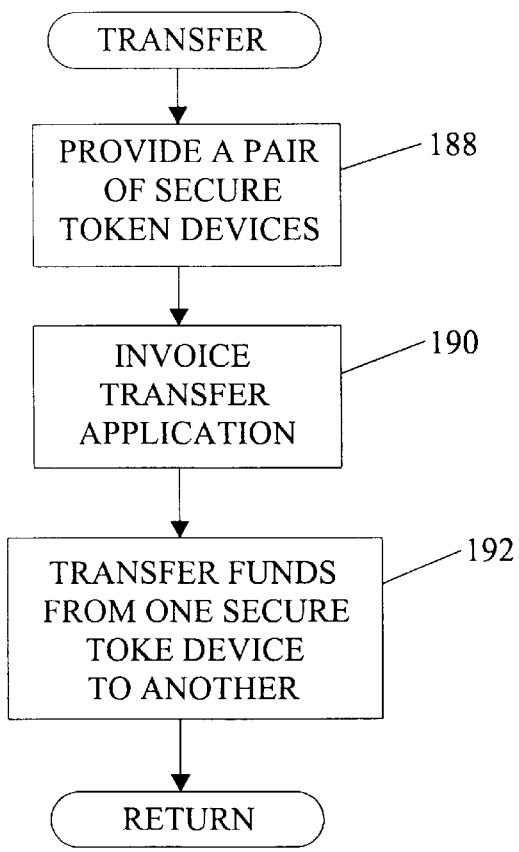
FIG. 11A is a flow chart that illustrates the steps that are performed to transfer electronic currency between two secure token devices.

FIG. 11A illustrates the steps that are performed in a transfer. Initially, a pair of secure token devices must be provided. For example, the secure token device for the manager of a business unit may constitute one of the secure token devices of an employee of that business unit may constitute the other device in the pair. An application program is provided as part of the distributed budgeting and accounting system to facilitate such card-to-card transfers. This transfer application is invoked (step 190 in FIG. 11A). The application then proceeds to transfer the funds from one secure token device to another (step 192 in FIG. 11A). The application program may request how much money is to be transferred and in which direction the transfer is to occur between the secure token devices.

Figure 11B:
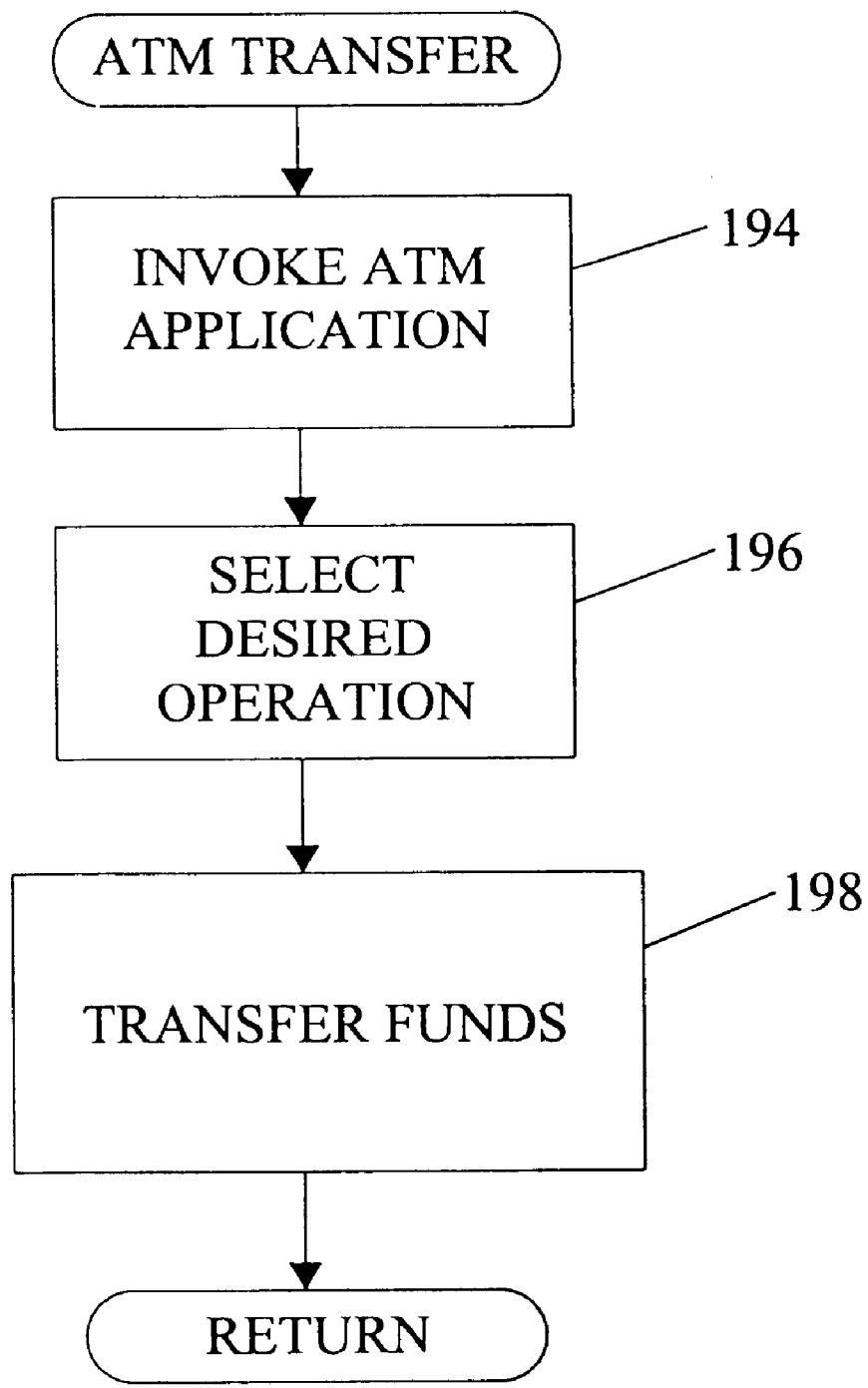
FIG. 11B is a flow chart that illustrates the steps performed in an automatic teller machine (ATM) type transfer of electronic currency.

The illustrative embodiment of the present invention also provides another mechanism for transferring funds. Specifically, the illustrative embodiment provides automatic teller machine (ATM) application that allows a party to obtain funds. The ATM application allows a user to pull funds from its parent in the hierarchy. A business unit account will be maintained for each business unit. This account is on the business unit secure token device and acts as a banking account in which funds for the business unit are present. The ATM application allows an employee of the business unit to obtain funds from the account. Initially, the employee invokes the ATM application (step 194 in FIG. 11B). The employee then selects the desired operation (i.e., withdrawal of a specified dollar amount) (step 196 in FIG. 11B). The ATM application then realizes the transfer of funds from the business unit secure token device to the employee's secure token device (step 198 in FIG. 11B).

Figure 12:
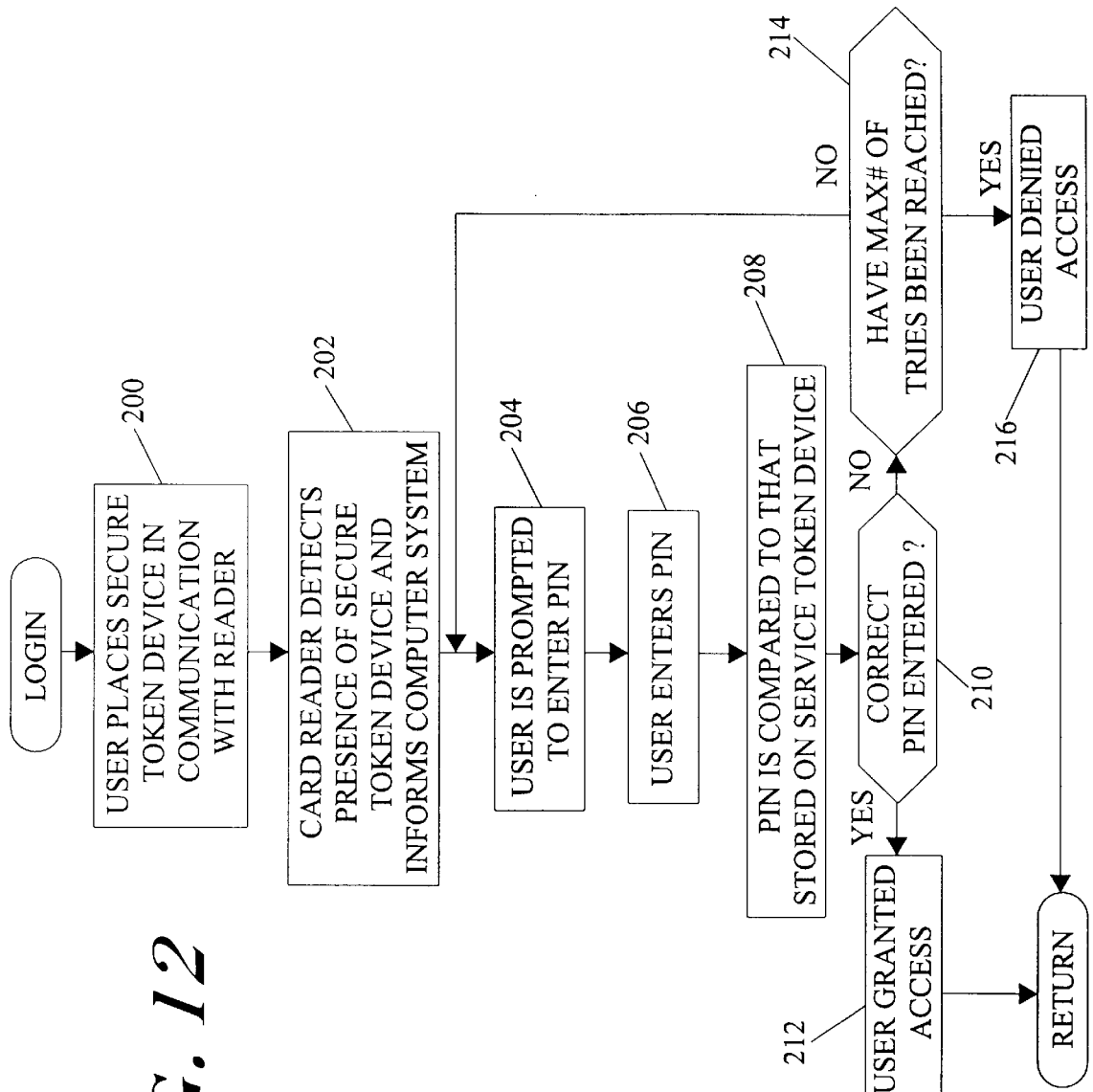
FIG. 12 is a flow chart that illustrates the steps that are performed for a user to log in using a secure token device.

Once a user has funds available on the secure token device of the user, the user may seek to spend the funds. In order for a user to spend funds, a user must first log on to the distributed computer system 10. FIG. 12 is a flow chart that illustrates the steps that are performed for a user to log in to the distributed computer system 10. Initially, the user places a secure token device in a card reader (step 200 in FIG. 12). Suppose for example that the user is attempting to log into workstation 14. The user then places the secure token device in communication with the reader 16. The reader 16 detects the secure token device and informs the computer system (step 202 in FIG. 12). A reader daemon may be provided to detect a secure token device. A daemon is a background process that performs useful tasks on the behalf of another party. The computer system then initiates the login process by prompting the user to enter a PIN (step 204 in FIG. 12). The PIN is preferably 4 to 8 characters in length so as to provide sufficient level of security. The user enters the PIN either via a keyboard that is part of the computer system or via a keypad that is contained on the reader (step 206 in FIG. 12). A copy of the appropriate PIN value is stored on the secure token device in the storage 72. In addition, the JavaCard API 80 identifies functions that may be used to compare an entered PIN to that stored on the secure token device to determine if there is a match. This method is invoked to perform such a comparison (step 208 of FIG. 12). A determination is made based on the comparison of whether the correct PIN was entered (see step 210 of FIG. 12). If a correct PIN has been entered, the user is granted access to the distributed computer system (step 212 in FIG. 12). If, however, the correct PIN is not entered, the user may be permitted to try again. The information stored on the secure token device may identify the maximum number of tries that may be attempted before the user is denied access. If the maximum number of tries have been reached (see step 214 of FIG. 12), the user is denied access (step 216 in FIG. 12). Otherwise, the number of tries is incremented and the process is repeated beginning at step 204. Alternatively, "Enigma" card type authentication may be used.

Figure 13:
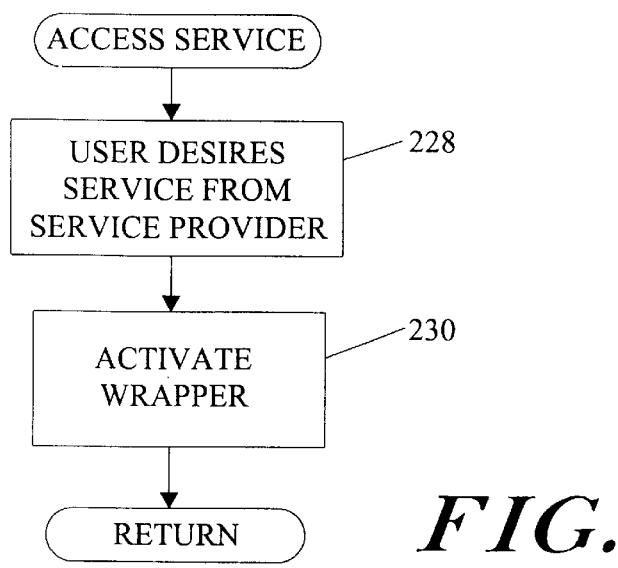
FIG. 13 is a flow chart that illustrates the steps that are performed for a user to access a service.

After the user has gained access to the distributed computer system 10, the user may desire a particular service that is provided by a service provider (step 228 in FIG. 13). For example, the user may desire to use a word processing program that is resident on the server, such as server 30. The user submits a request to access the service. Before the application program associated with the service provider is executed, determination must be made whether the user is permitted to access the service and the user must pay for the service. To facilitate these preliminary steps, a wrapper program is provided within the distributed budgeting and accounting system. The wrapper program is charged with the responsibility of doing the appropriate checking and activating the application associated with the service. Thus, in step 230 of FIG. 13, the wrapper program is activated.

Figure 14:
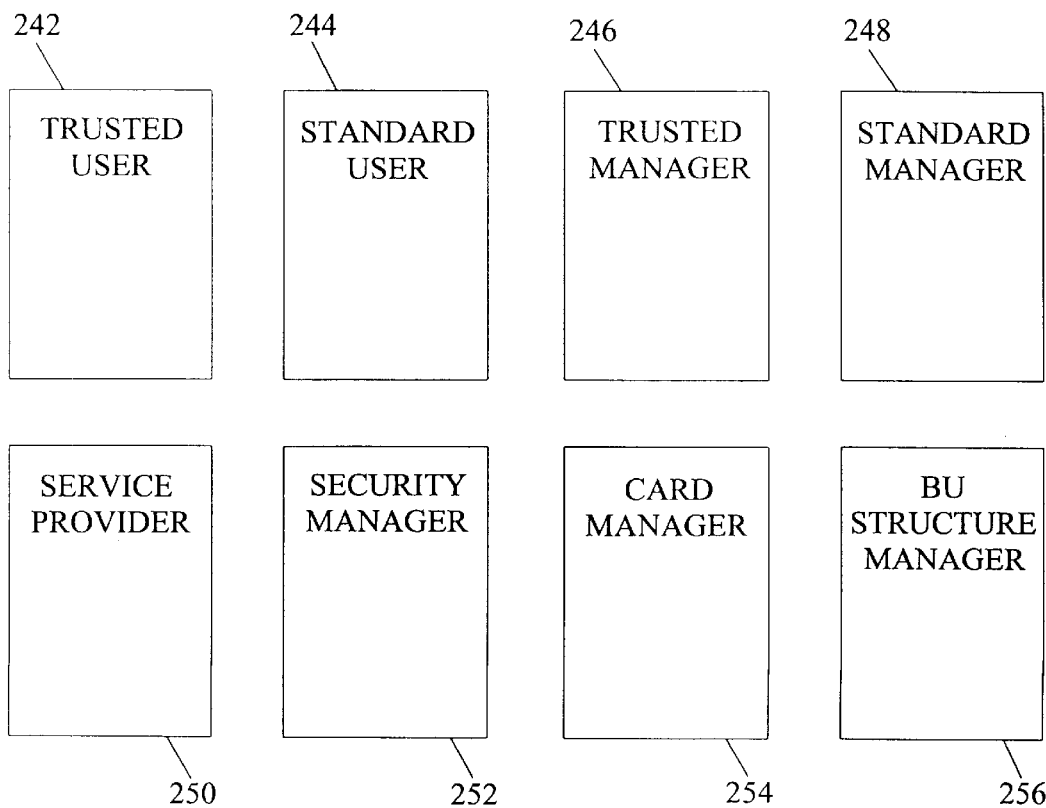
FIG. 14 illustrates different types of roles that are defined for parties in the illustrated embodiment consistent with the principles of the present invention.

The wrapper program must check if the user permitted to access the service. Each user that participates within the internal economy is assigned a particular role. A user may have multiple roles but only one role is active for a given transaction. Each role has certain permissions associated with it. Roles are assigned by managers to users as a general rule. The wrapper checks the role assigned to the user. FIG. 14 illustrates the different roles that may be assigned to a user. Rights associated with a given role may include the ability to move money between business units, the ability to negotiate contracts (i.e. reach an agreement between the contracted parties as to terms of the contract), the ability to define services and generic contracts, the ability to define access rights, the ability to maintain a business unit structures and the ability to manage smart cards. A trusted user 242 is a role that has permission to push and pull currency from a business unit that is immediately above it and has the ability to negotiate contracts. A "contract" is an object that defines the terms for which a user pays for and accesses a service. A standard user 244 is a role where the user can negotiate contracts. A trusted manager 246 can push and pull tokens relative to business units above and below the business unit of the manager. A standard manager 248 can push and pull electronic currency only with the business units that are immediately above and immediately below the business unit of the manager. A service provider 250 is able to define services and generic contracts. A security manager 252 can define roles and the rights associated with the roles. A security manager 254 can manage smart cards. A business unit structure manager can add business units, delete business units, add parent business units, and delete parent business units.

The distributed budgeting and accounting system facilitates the definition of the new roles and assigning sets of rights to those roles. As mentioned above, a manager assigns roles to his subordinates. The roles that are described above are merely illustrative and not intended to be limiting of the present invention. The roles described above need not be utilized in practicing the present invention. Instead, different roles may be defined and used.

Figure 15:
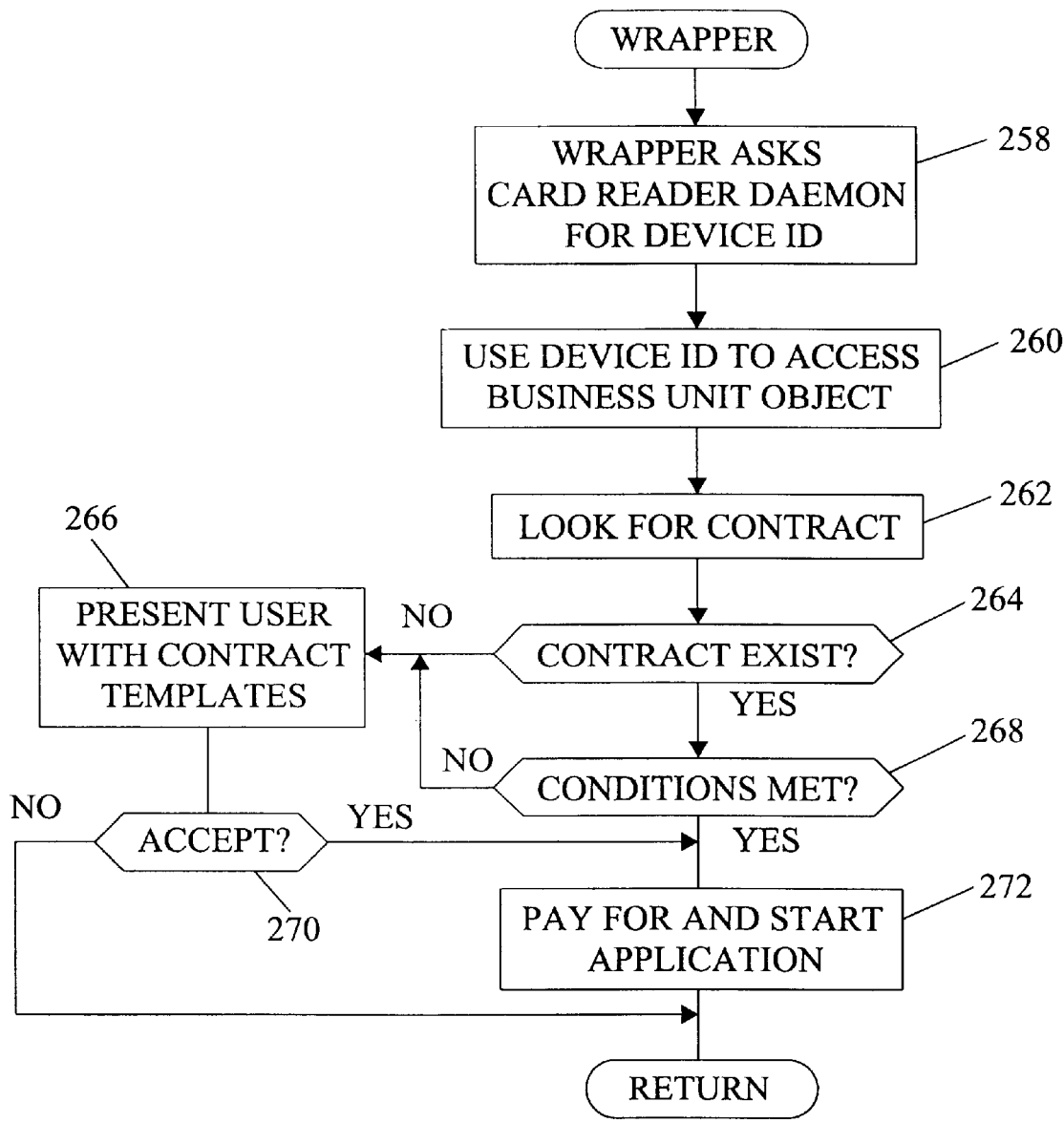
FIG. 15 is a flow chart that illustrates the steps that are performed by a wrapper program.

FIG. 15 is a flow chart of the steps that are performed by the wrapper program when activated. Initially, the wrapper program asks a daemon at the reader to obtain the device ID (i.e., device identification) for the secure token device that is in communication with the reader of the user computer system (step 258 in FIG. 15). As has been discussed above, each secure token device has a unique device ID associated with it. The wrapper then uses this device ID to identify the business unit associated with the user of the secure token device. The business unit object for that business unit is then accessed (step 260 in FIG. 15).

The wrapper has to be cognizant of the different payment schemes that may be utilized by a user in accessing services. In general, two options are provided: periodic payment for unlimited access and pay-per-view. With the periodic payments for unlimited access, a fixed price is paid for unlimited access rights to a specific set of applications within a specified time period (e.g., hour, day, month, quarter, year). With pay-per-view, a fixed price is paid at each application invocation. The system supports the prepayment of multiple instances of pay-per-view type services.

Figure 16:
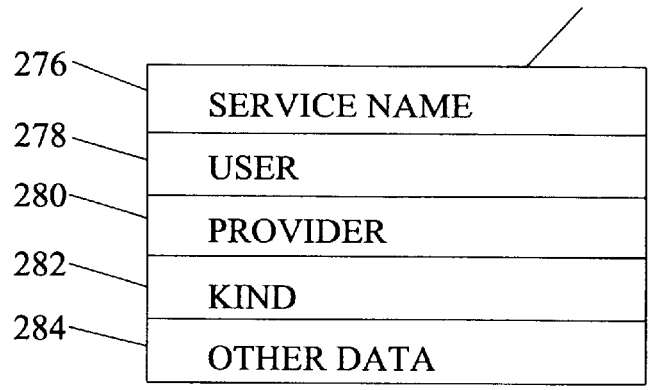
FIG. 16 illustrates the attributes of a contract object.

Contracts are created to formalize service agreements between the service provider and the user. In order for a user to enter into a contract to obtain services from the service provider, the user must have sufficient access rights. In other words, the user must have the appropriate permissions to access the service. Each contract is represented by an instance of the contract object class. A number of attributes are provided in the contract attribute to encode the details of the contract. FIG. 16 depicts the attributes for a contract object 274. The service name attribute 276 identifies the service that is provided. The user attribute 278 identifies the user that is involved in the contract. The provider attribute 280 identifies the service provider. The kind attribute 282 identifies the type of contract. For example, the contract may be a periodic payment contract, a pay-per-view contract, etc. The contract also may include other data.

In step 262 of FIG. 15, the wrapper program looks for a contract between the user and the service that is provided by the service provider. If a contract exists (see step 264 in FIG. 15), the wrapper determines whether the conditions of the contract are met (step 268 in FIG. 15). In instances where the conditions are met, users are required to pay for the service if the service has not already been paid for and the resulting application started (step 272 in FIG. 15).

A contract need not always relate to an arrangement where a user pays for a service. Instead, the user may be paid in some instances by the service provider.

In instances where a contract does not exist, the user will be presented with a number of contract templates that set forth a set of conditions (step 266 in FIG. 15). Each template constitutes a logical grouping of a different set of options. The user may accept one of the templates (see step 270 in FIG. 15) and be requested to pay for the application program so the application may be started (step 272 in FIG. 15). Alternatively, the user may reject the contract template and not be granted access to the service. If a contract exists but the conditions are not met, it is as if there was no contract and the above-described steps beginning with step 266 will be repeated.

Thus, in summary, after the electronic currency tokens are distributed throughout the internal economy, the individual smart card holders are entrusted to spend the currency responsibly, and the currency is spent on resources in the internal economy (step 93 in FIG. 6). The service providers act as electronic stores where currency may be spent.

A number of objects are stored persistently in the distributed system to realize the distributed budgeting and accounting system. These objects include business unit objects, contract objects, role objects, a smart card registry object and other varieties of objects.

One of the benefits of the present invention is that it provides a tie between the initial budgeting process and the subsequent accountability for use of expensive resources. The illustrative embodiment of the present invention helps to motivate managers and users to optimize usage of expensive resources. The tracking of resources is achieved without the need for cumbersome registration tools and manual tracking systems. The distribution of budgets occurs via card-to-card transfers.

As has been discussed above, the distributed budgeting accounting system provides an accounting for use of resources (step 95 in FIG. 6). Transactions are entered into a fictitious general ledger. The ledger may be used to generate reports and ensure queries. This enables corporations and other entities to have a reasonable accounting of information that identifies internal costs and an appropriate level of granularity for management reporting. This includes providing accounting information for resources that are shared across multiple business units. The system is configurable to determining what types of transactions are logged and what type are not.

Figure 17:
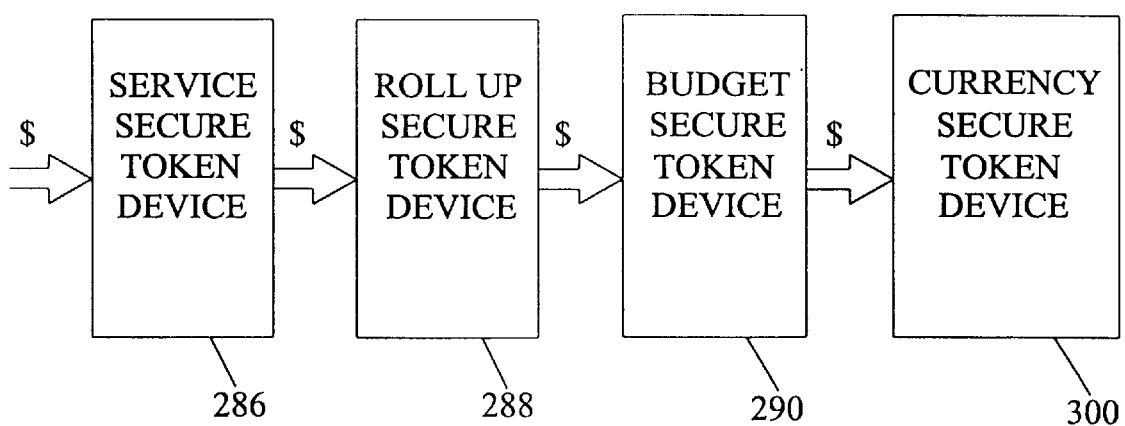
FIG. 17 illustrates the flow of electronic currency that is received by a service provider secure token device.

In various points of time, it may be useful to perform a roll up so that unused card money would be pushed back up the hierarchy to the central corporate bank (step 97 in FIG. 6). The timing of rollups is configurable by the organization. Some of these funds include those that have been accumulated by service providers. FIG. 17 illustrates the general flow of funds back to the currency secure token device. The user pays for the service provided by a service provider, electronic currency tokens are passed to a service secure token device 286. Electronic currency tokens from the service secure token device are then passed to a roll up secure token device 288. The roll up secure token device 288 passes the accumulated electronic currency tokens to a budget secure token device 290. The budget secure token device 290 then passes the accumulated electronic currency tokens to the currency secure token device 300. Thus, it can be seen that the money spent on resources may be recirculated within the internal economy by pushing the funds back up the hierarchy.

It should further be appreciated that funds may also be passed from individual users to managers of business units. The managers of business units may continue to push funds up until a budget secure token devices 290 is reached. The budget secure token device 290 may then pass the funds to the currency secure token device 200. In other words, the fund flow depicted in 10 is reversed.

While the present invention has been described with reference to an illustrative embodiment thereof, those skilled in the art will appreciate the various changes in form and detail may be made without departing from the intended scope of the present invention as defined in the claims. For example, the present invention may be practiced with secure electronic devices other than smart cards or ibuttons. Moreover, the currency tokens on the secure token device need not be MONDEX-compatible; rather alternative varieties of tokens may be used.

What is claimed:

1. In a computer network, a computerized method, comprising the steps of:
   providing a budget for an organization that identifies quantities of funds to be distributed to components of the organization for a budgeting time period;
   providing secure token devices for the components of the organization; and
   electronically distributing the funds to the components of the organization according to the budget by performing transfers of the funds between the secure token devices.

2. The method of claim 1 wherein the secure token devices are smart cards.

3. The method of claim 1 wherein electronically distributing the funds comprises transferring to electronic currency tokens between the secure token devices.

4. The method of claim 1 wherein the organization is a corporation.

5. The method of claim 4 wherein the components of the organization include business units.

6. The method of claim 5 wherein the components include individual employees.

7. The method of claim 1 wherein the computer network includes a distributed budgeting computer program and wherein the distributed budgeting computer program performs the electronic distributing of the funds.

8. The method of claim 1 wherein the computer network includes a service provider for providing a service and wherein a portion of the funds transferred to a selected one of the secure token device is paid to the service provider for providing the service to a given one of the components of organization.

9. The method of claim 8 wherein the service provider has a secure token device and the portion of the funds are paid to the service provider by transferring the portion of the funds from the selected secure token device to the secure token device of the service provider.

10. The method of claim 9 wherein the selected secure token device and the secure token device of the service provider are smart cards.

11. In a computer network wherein components of an organization have associated secure token devices, a computer-readable medium holding computer-executable instructions for performing a method comprising the steps of:
   defining a budget for the organization that identifies quantities of funds to be distributed to components of the organization for a budgeting time period; and
   facilitating electronic distribution of the funds to the components of the organization according to the budget by performing transfers of the funds between the secure token devices.

12. The computer-readable medium of claim 11 wherein the secure token devices are smart cards.

13. The computer-readable medium of claim 11 wherein the electronic distribution of the funds comprises transferring electronic currency tokens between the secure token devices.

14. In a computer network that provides computing resources for an organization having resource consumers, a method comprising the steps of:
   receiving a request on behalf of a selected one of the resource consumers to use a given one of the computing resources;
   requesting payment for use of the given computing resource by the selected resource consumers; and
   receiving electronic payment for the use of the given computing resource from the selected resource consumers.

15. The method of claim 14 wherein the electronic payment entails transferring electronic currency tokens.

16. The method of claim 14 wherein the electronic payment originates from a smart card of the selected resource consumers.

17. The method of claim 14 wherein a smart card is associated with the given computing resource and wherein the electronic payment is received by the smart card associated with the given computing resource.

18. The method of claim 14 further comprising the step of permitting the selected resource consumer to use the given computing resource.

19. The method of claim 14 wherein requesting payment comprises requesting payment for use over a predetermined time period.

20. The method of claim 14 wherein requesting payment comprises requesting payment for a given session of use of the computing resource.

21. The method of claim 14 wherein requesting payment requires payment for multiple sessions of use of the computing resource.

22. In a computer network that provides computing resources for an organization having members a computer-readable medium holding computer-executable instructions for performing a method comprising the steps of:
   receiving a request on behalf of a selected one of the members to use a given one of the computing resources;
   requesting payment for use of the given computing resource by the selected member; and
   receiving electronic payment for the use of the given computing resource from the selected member.

23. The computer-readable medium of claim 22 wherein the electronic payment entails transferring electronic currency tokens.

24. The computer-readable medium of claim 22 wherein the electronic payment originates from a smart card of the selected member.

25. The computer-readable medium of claim 22 wherein the electronic payment is received by the smart card associated with the given computing resource.

26. The computer-readable medium of claim 22 wherein requesting payment comprises requesting payment for use over a predetermined time period.

27. The computer-readable medium of claim 22 wherein requesting payment comprises requesting payment for a given session of use of the computing resource.

28. The computer-readable medium of claim 22 wherein requesting payment requires payment for multiple sessions of use of the computing resource.

29. In a computing environment wherein secure token devices for a hierarchical organization having multiple levels paying from highest to lowest are associated with a central bank, levels of the organization and service providers that provide services, a method comprising the computer-implemented steps of:
   providing a budget that identifies how many funds are granted to the levels of the organization for a budgetary period;
   transferring electronic funds from the secure token device associated with the central bank to the secure token devices associated with at least some of the levels of the organization to realize distribution of the budget;
   distributing at least some of the funds from a selected secure token device associated with one of the levels of a given secure token device associated with the lowest level of the organization; and
   transferring funds from the given secure token device to one of the secure token devices associated with a selected one of the service providers to pay for services provided by the selected service provider.

30. The method of claim 29 further comprising the step of transferring funds from the secure token device associated with the selected service provider to the secure token device associated with the central bank.

31. The method of claim 30 wherein the funds that are transferred to the secure token device associated with the central bank are transferred to at least one secure token device associated with a level of the organization as part of the transferring to the secure token device associated with the central bank.

32. The method of claim 29 wherein the organization is a business organization and the levels include business units.

33. The method of claim 32 wherein the lowest level of the business organization represents individuals that are part of the organization.

34. The method of claim 29 wherein the secure token devices are smart cards.

35. In a computer network in an organization having computer resources, a computer-implemented method comprising the steps of:
   obtaining identification information from a secure token device to determine whether a user is permitted to connect to the computer network;
   based on the identification information permitting the user to connect to the computer network;
   checking at least one role assigned to the user, wherein each role has rights for accessing the first of the computer resources;
   receiving electronic currency tokens from the secure token device of the user as payment for access to a first of the computer resources based on the checking of at least one role assigned to the user; and
   granting the user access to the first of the computer resources.

36. The method of claim 35 wherein the method further comprises the step of receiving electronic currency tokens from the secure token device of the user as payment for access to a second of the computer resources.

37. The method of claim 35 wherein the secure token device is a smart card.

38. In a computer network in an organization having computer resources, a computer-readable medium holding computer-executable instructions for performing a method, comprising the steps of:
   obtaining identification information from a secure token device to determine whether a user is permitted to connect to the computer network based on the identification information permitting the user to connect to the computer network;
   checking at least one role assigned to the user, wherein each role has rights for accessing the first of the computer resources;
   receiving electronic currency tokens from the secure token device of the user as payment for access to a first of the computer resources based on the checking of at least one role assigned to the user; and
   granting the user access to the first of the computer resources.

39. In a distributed computer system in an organization having resources where a secure token device holds currency tokens that constitute a portion of a budget allocated to pay for use of the resources, a method comprising the computer-implemented steps of:
   providing an application program for dispersing currency tokens to the secure token device in the organization;
   activating the application program; and
   with the application program, dispersing additional currency tokens to the secure token device in the organization.

40. The method of claim 39 wherein the secure token device is a smart card.

41. The method of claim 39 wherein the secure token device is an ibutton.

42. A system, comprising:
   a server computer system for providing a service to a user;
   a user computer system for use by the user to gain access to the service provided by the server;
   a first secure token device reader coupled to the user computer system for receiving a secure token device and communicating with the secure token device; and
   an access component for granting the user access to the system when the user places a valid secure token device in the first secure token device reader.

43. The system of claim 42 further comprising a valid user secure token device to be placed into the first secure token device reader.

44. The system of claim 43 wherein the valid user secure token device holds identification information regarding the user and the identification information is used by the access component.

45. The system of claim 42 further comprising a second secure token device reader coupled to the server computer for receiving a secure token device for the service.

46. The system of claim 45 further comprising a charging component for charging the user for accessing the service provided by the server computer and for transferring electronic currency from the user secure token device to the secure token device for the service.

47. The system of claim 42 wherein the secure token device is a smart card.

48. A distributed computer system resource comprising:
   at least one processor for running;
   a budgeting component for establishing a budget for an organization that is hierarchically organized into levels and for distributing electronic currency to secure token devices provided for respective levels of the organization; and a commerce component for facilitating exchange of electronic currency as payment for use of the resources.

49. The distributed computer system of claim 48 further comprising an accounting component run on the processor for tracking the exchange of electronic currency in the distributed computer system.

50. The distributed computer system of claim 48 wherein the secure token devices are smart cards.

51. A computer network, comprising:

means for providing a budget for an organization that identifies quantities of funds to be distributed to components of the organization for a budgeting time period;

secure token devices for the components of the organization;

means for electronically distributing the funds to the components of the organization according to the budget by performing transfers of funds between the secure token devices.

52. The computer network of claim 51 wherein the secure token devices are smart cards.

53. The computer network of claim 51 wherein the means for providing a budget comprises a distributed budgeting computer program.

54. In a computer network having computing resources, a system comprising:

means for obtaining identification information from a secure token device to determine whether a user is permitted to connect to the computer network;

means for permitting the user to connect to the computer network based on the identification information;

means for checking at least one role assigned to the user, wherein each role has rights for accessing the first of the computer resources;

means for receiving electronic currency tokens from the secure token device of the user as payment for access to a first of the computer resources based on the checking of at least one role assigned to the user; and means for granting the user access to the first of the computer resources.

55. They system of claim 54 wherein the secure token device is a smart card.

56. The system of claim 54 further comprising means for receiving electronic currency tokens from the secure token device of the user as payment for access to a second of the computer resource.

57. A secure token device adapted to transmitting identification information for a user to a computer system, receiving a request for electronic currency tokens form the computer system as payment for access to computer resources, checking at least one role assigned to the user, wherein each role have rights for accessing computer resources; transmitting the electronic currency tokens to the computer system as payment for access to the computer resources based on the checking of at least one role assigned to the user and receiving approval to access the computer resources.

58. The secure token device of claim 57 wherein the secure token device is a smart card.

59. A medium over which communication signals travel, said signals containing computer-executable instructions for performing a method in a computer network of an organization wherein components have associated secure token devices, comprising the steps of:

defining a budget for the organization that identifies quantities of funds to be distributed to components of the organization for a budgeting time period; and facilitating electronic distribution of the funds to the components of the organization according to the budget by performing transfers of the funds between the secure token devices.

60. The medium of claim 59 wherein the secure token devices are smart cards.

61. A medium over which communication signals travel, said signals containing computer executable instructions for performing a method in a computer network that provides computer resources for an organization having resource consumers, comprising the steps of:

receiving a request on behalf of a selected one of the resource consumers to use a given one of the computing resources;

checking at least one role assigned to the user, wherein each role has rights for accessing the given one of the computing resources;

requesting payment for use of the given computing resource by the selected resource consumers based on the checking of at least one role assigned to the user; and receiving electronic payment for the use of the given computing resource from the selected resource consumers based on the checking of at least one role assigned to the user.

* * * * *